United States Patent [19]

Ogden

[11] Patent Number: 5,714,229

[45] Date of Patent: *Feb. 3, 1998

[54] SLIP-RESISTANT, MOISTURE ABSORBENT SHEET MATERIAL

[75] Inventor: John M. Ogden, Cincinnati, Ohio

[73] Assignee: Ogden, Inc., Cincinnati, Ohio

[*] Notice: The term of this patent shall not extend beyond the expiration date of Pat. No. 5,388,349.

[21] Appl. No.: 573,628

[22] Filed: Dec. 18, 1995

Related U.S. Application Data

[63] Continuation of Ser. No. 259,238, Jun. 13, 1994, Pat. No. 5,607,745, which is a continuation-in-part of Ser. No. 828,690, Jan. 31, 1992, abandoned.

[51] Int. Cl.$^6$ .................... A43B 13/38; B32B 3/10
[52] U.S. Cl. .................... 428/138; 428/116; 428/483; 428/338; 428/318.4; 428/424.4; 428/907; 36/43; 36/3 B; 442/35; 442/57
[58] Field of Search .................... 428/116, 138, 428/483, 338, 318.4, 424.4, 907; 36/43, 44, 3 B; 442/35, 57

[56] References Cited

U.S. PATENT DOCUMENTS

| 354,693 | 12/1886 | Dick | 36/3 B |
|---|---|---|---|
| 1,106,986 | 8/1914 | Stücki | 36/3 B |
| 1,994,681 | 3/1935 | Blumenfeld | 36/28 |
| 2,300,681 | 11/1942 | Margolin | 36/3 |
| 2,432,533 | 12/1947 | Margolin | 36/3 |
| 2,722,063 | 11/1955 | Drefvelin | 36/3 |
| 2,748,502 | 6/1956 | Scholl | 36/44 |
| 3,383,782 | 5/1968 | McGinnity | 36/3 |
| 3,449,844 | 6/1969 | Spence | 36/44 |
| 3,530,489 | 9/1970 | Appleton | 36/44 |
| 3,555,709 | 1/1971 | Raffaelli, Sr. | 36/44 |
| 3,724,105 | 4/1973 | Weight | 36/44 |
| 3,978,257 | 8/1976 | Ring | 428/137 |
| 4,054,706 | 10/1977 | Shapiro | 428/213 |
| 4,093,765 | 6/1978 | Schmidt | 428/134 |
| 4,099,342 | 7/1978 | Singh | 36/44 |
| 4,187,621 | 2/1980 | Cohen | 36/44 |
| 4,223,458 | 9/1980 | Kihara | 36/44 |
| 4,237,626 | 12/1980 | Brown | 36/43 |
| 4,263,727 | 4/1981 | Render et al. | 36/44 |
| 4,316,926 | 2/1982 | Kaminstein | 428/137 |
| 4,361,614 | 11/1982 | Moffitt, Jr. | 428/138 |
| 4,430,811 | 2/1984 | Okada | 36/45 |
| 4,461,099 | 7/1984 | Bailly | 36/44 |
| 4,471,538 | 9/1984 | Pomeranz et al. | 36/28 |
| 4,524,529 | 6/1985 | Schaefer | 36/98 |
| 4,602,442 | 7/1986 | Revill et al. | 36/44 |
| 4,627,179 | 12/1986 | McElroy | 36/44 |
| 4,635,385 | 1/1987 | Ogden | 36/43 |
| 4,642,912 | 2/1987 | Wildman et al. | 36/44 |
| 4,710,185 | 12/1987 | Sneyd, Jr. et al. | 604/372 |
| 4,729,179 | 3/1988 | Quist, Jr. | 36/44 |
| 4,789,578 | 12/1988 | Twyford et al. | 428/40 |
| 4,806,411 | 2/1989 | Mattingly, III et al. | 428/139 |
| 4,845,862 | 7/1989 | Phillips, Jr. et al. | 36/43 |
| 4,893,418 | 1/1990 | Ogden | 428/138 |
| 4,910,887 | 3/1990 | Turner et al. | 36/8.1 |
| 4,925,724 | 5/1990 | Ogden | 428/137 |
| 5,350,625 | 9/1994 | Peterson et al. | 428/98 |
| 5,388,349 | 2/1995 | Ogden | 36/43 |
| 5,433,987 | 7/1995 | Peterson et al. | 428/137 |

FOREIGN PATENT DOCUMENTS

| 1026299 | 4/1953 | France . |
| 1142786 | 9/1957 | France . |
| 501878 | 4/1939 | United Kingdom . |
| 728075 | 4/1955 | United Kingdom . |

*Primary Examiner*—William Watkins
*Attorney, Agent, or Firm*—Holland & Knight LLP

[57] ABSTRACT

A sheet material which includes an apertured top layer formed of a non-absorbant, thermally non-conductive thermoplastic material, a non-woven layer having a first portion formed of a mixture of moisture-wicking and moisture-absorbent fibers affixed to the top layer, and, optionally, a second portion including fibers which are non-adsorbent and non-absorbent, and, in various embodiments, a barrier layer and/or cushioning layer forming a laminate in which the non-woven layer is sandwiched between the top layer and such other layers. The chemical formulation of the top layer of thermoplastic material can be varied to alter its coefficient of friction or degree of slip resistance depending upon the requirements of a particular application.

44 Claims, 2 Drawing Sheets

SLIP-RESISTANT, MOISTURE ABSORBENT SHEET MATERIAL

This is a continuation of application Ser. No. 08/259,238 filed Jun. 13, 1994 U.S. Pat. No. 5,607,745 which is a continuation-in-part of application Ser. No. 07/828,690 filed Jan. 31, 1992, now abandoned.

FIELD OF THE INVENTION

This invention relates generally to slip-resistant, moisture-absorbent sheet material, and, more particularly, to a sheet material comprising a laminate of a non-absorbent, thermally non-conductive thermoplastic top layer formed with apertures, and a moisture-absorbent non-woven layer which can be affixed to at least one other layer such as a barrier layer and/or a cushioning layer.

BACKGROUND OF THE INVENTION

A large portion of the materials which we walk on, e.g. insoles of shoes, indoor carpeting, outdoor carpeting, floor mats, etc., have a basic construction which has remained substantially the same for a number of years. In most instances, such materials consist essentially of a top layer of fibrous cloth or fabric material which touches the foot, and a second layer of backing material connected to the top layer which may or may not have cushioning properties. Despite improvements in certain aspects of these types of products such as wear life and comfort, little or no attention has been paid to characteristics such as moisture-absorbency, slip-resistance or thermal conductivity.

For example, in the design of insoles for shoes, and particularly insoles for athletic shoes or other active wear articles of footwear, an effort has been made to improve the cushioning characteristics of sheet material utilized to fabricate such insoles to enhance comfort. But the configuration and surface characteristics of the sheet material for such insoles have been ignored as they relate to (1) the ability of the insole to maintain the foot and sock insulated from the sole of the article of footwear; (2) the extent to which the foot and sock are permitted to move within the article of footwear; and (3) the ability of the insole to maintain the wearer's sock substantially dry.

One problem with the sheet materials employed to fabricate insoles for active wear footwear involves a failure to control the motion of the sock of the wearer relative to the insole and/or the motion of the foot of the wearer with respect to the sock. This affects both the comfort and performance of the shoe. For example, certain activities such as the play of tennis on clay courts and soccer on grass result in substantial movement of the shoe with respect to the playing surface. In these types of activities, it is desirable to limit the movement of the foot and sock with respect to the insole of the article of footwear for added comfort and to optimize the performance of the footwear. On the other hand, comfort and performance dictate that the foot and sock be permitted more movement within articles of footwear intended for use on high friction surfaces such as lacquered hardwood floors or artificial playing fields wherein limited movement of the article of footwear relative to the playing surface is permitted, and therefore relatively high shear forces are transmitted from the shoe to the foot.

Prior insoles can generally be divided into two categories, depending upon the type of sheet material employed, both of which fail to take into account the movement of the foot and/or sock within the article of footwear and the type of surface on which the footwear is utilized. In some designs, the top surface of the sheet material from which such insoles are made is formed of a tacky or sticky sheet material, or a material which becomes relatively tacky when exposed to moisture from the foot. Insoles made with sheet material of this type exhibit a higher coefficient of friction than the coefficient of friction of the skin of the foot. As a result, the magnitude of the frictional engagement between the sock and the sheet material at the top of the insole is greater than the magnitude of the frictional engagement between the foot and sock. Articles of footwear provided with insoles having this type of sheet material have been found to create blisters on the foot during use because the foot is allowed to move within the sock in response to the application of a shear force, i.e., a front-to-rear, side-to-side and/or rotational foot motion, while the sock is held in an essentially fixed position atop the insole. The rubbing motion of the foot within the sock can create severe blistering and discomfort, particularly in activities such as basketball, racquetball, aerobics and the like played on hardwood floor which permit limited motion of the shoe therealong.

Another general category of insole designs employs sheet material formed with a rubber or foam bottom layer which is covered by an overlayer of cloth or synthetic sheet material having a relatively slippery or slick surface with a much lower coefficient of friction compared to that of the skin. Insoles made with sheet material of this type help avoid the blistering problem because the foot and sock can move as a unit relative to the slippery top layer of the insole, instead of the foot moving within the sock. But the problem with these insoles is that movement of the sock and foot of the wearer is often completely unrestricted by the material forming the top layer thereof, and the toes are permitted to violently slide into the toe portion of the article of footwear causing bruising or even fractures. In addition, undue movement of the foot and sock gives the wearer a feeling of lack of control of the footwear, particularly in activities where the footwear readily slides along the playing surface.

Both types of sheet materials described above also suffer from a complete failure to assist in maintaining the foot and sock of the wearer dry. Whether the top, foot-engaging layer of the sheet material has a high or low coefficient of friction, such layers have no capability of wicking or otherwise removing moisture from the interface with the foot or sock. As a result, the insoles made from such sheet materials have an uncomfortable wet or damp feel, particularly when used in articles of footwear intended for athletic activities or other active wear.

Problems with slip-resistance, moisture-absorbency and thermal insulation are also prevalent in sheet materials intended for products other than insoles, e.g. indoor-outdoor carpeting; floor coverings for boats, campers, swimming pool decks, etc; floor mats, gloves, grips for tools and the like, and other items. In many products of this type, the surface which comes into contact with the foot or hands has limited slip resistance and can become particularly slippery and hazardous when wet. Additionally, failure to wick away moisture from the surface can further reduce slip-resistance and create discomfort to one using or wearing such sheet material. Further, sheet materials used for different types of floor coverings or the like often provide only limited thermal insulation to protect the feet from the heat or cold of the surface upon which the sheet material rests.

These problems have been addressed in U.S. Pat. Nos. 4,893,418 and 4,925,724, owned by the assignee of this invention. The sheet material disclosed in the U.S. Pat. No. 4,925,724 patent comprises a bottom layer formed of a cushioning material such as rubber or foamed plastic having an upper surface and a lower surface. The top layer of the sheet material is formed of a non-absorbent, thermally non-conductive thermoplastic material having a plurality of apertures which define intersecting columns and rows of thermoplastic strands or wall sections. The top layer is at least partially embedded in the bottom, cushioning layer so that a portion of the top layer extends beneath the upper surface of the bottom layer and the cushioning material forming the bottom layer at least partially enters the apertures in the top layer.

As discussed in U.S. Pat. No. 4,925,724, the thermoplastic material forming the top layer of the sheet material can be varied to alter the coefficient of friction, as desired. When used to manufacture an insole, such sheet material exhibits frictional characteristics which are effective to control the movement of the foot and sock within an article of footwear. In particular, the coefficient of friction of the apertured top layer of the sheet material is chosen such that the magnitude of the frictional engagement between the sock and such top layer is less than the magnitude of the frictional engagement between the foot and sock. This is true whether the sheet material is wet or dry. As a result, the foot and sock move together as a unit with respect to the top layer of an insole formed with such sheet material in response to the application of a shear force to the foot, thus preventing the blistering problem caused by prior insoles mentioned above. Additionally, the coefficient of friction of such top layer of the sheet material is chosen to provide at least some slip resistance where the article of footwear is intended for use on playing surfaces with a high coefficient of friction (hardwood floors, artificial fields), and a somewhat greater slip-resistance where the article of footwear is intended for use on surfaces having a lower coefficient of friction (e.g., clay tennis courts, grass fields, etc.).

While the sheet material disclosed in U.S. Pat. No. 4,925,724 provides a number of advantages, it has been found that some potential problems can arise with the use of such material to form insoles for articles of footwear, indoor-outdoor carpeting, floor mats and other items. As mentioned above, the apertures in the top layer of the sheet material form a matrix of interconnected wall sections, such as squares, triangles or the like. These wall sections are on the order of about 0.6 millimeters in thickness and about 0.5 millimeters in width. The thermoplastic material utilized for form this relatively thin apertured top layer exhibits good strength in compression, but is comparatively weak in shear. As a result, shear forces created by front-to-back, side-to-side and/or rotational motion along the apertured top layer has a tendency to stretch, pull or otherwise move the wall sections of the top layer relative to one another. The resilient cushioning material within which the apertured top layer is embedded offers substantially no resistance to the application of such shear forces and thus readily permits such relative motion of the wall sections. The apertured top layer is therefore subject to tearing or ripping of its wall sections, and the cushioning material beneath can become worn and break down as the apertured top layer moves therealong.

Another potential limitation of the sheet material disclosed in U.S. Pat. No. 4,925,724 is that moisture from the foot and sock can collect along the apertured top layer because little or ineffective wicking and/or absorption of such moisture takes place within the cushioning layer beneath. Although some types of open cell foam materials can be utilized to form the cushioning layer affixed to the apertured top layer, such foam materials provide only a limited degree of moisture absorption and little or no wicking or channeling away of moisture from the top layer. Other types of foam materials, such as closed cell foams, provide essentially no absorption or wicking capability whatsoever.

Another potential problem with the use of the sheet material disclosed in U.S. Pat. No. 4,925,724 in certain types of applications is that the apertured top layer can become delaminated from the cushioning layer. As disclosed in such patent, the apertured top layer and cushioning layer are interconnected by introducing the top layer onto the cushioning layer when it is in a "foamed" state, i.e. wherein the material has the consistency of whipped cream or the like before it is cured to form a solid sheet. Alternatively, the apertured top layer can be affixed to cushioning materials such as polyurethane which is liquid when initially combined with the top layer and thereafter cures to form a solid layer. In either case, the only connection between the apertured top layer and cushioning layer is the extent of surface contact between the cushioning material and the bottom and sides of the wall sections of the apertured top layer. This is a relatively small surface area. Additionally, the wall sections are made relatively smooth to provide comfort when contacted by the foot, which further increases the difficulty of obtaining a secure bond between the top layer and cushioning layer sufficient to avoid delamination.

SUMMARY OF THE INVENTION

It is therefore among the objectives of this invention to provide a sheet material, adapted for such uses as insoles for articles of footwear and for slip-resistant, moisture-absorbent surface coverings for a variety of articles, which controls the movement of objects on the top surface of such sheet material, which is resistant to wear, which is moisture-absorbent, and, which provides a thermal barrier.

These objectives are accomplished in a sheet material according to this invention which includes a top layer formed of a non-absorbent, thermally non-conductive thermoplastic material, a non-woven layer formed of a mixture of moisture-wicking and moisture-absorbent fibers affixed to the top layer, and, in various embodiments, a barrier layer and/or cushioning layer forming a laminate in which the non-woven layer is sandwiched between the top layer and such other layers. The chemical formulation of the top layer of thermoplastic material can be varied to alter its coefficient of friction or degree of slip resistance depending upon the requirements of a particular application.

One aspect of this invention is predicated upon the concept of increasing the wear life and dimensional stability of the top layer of the sheet material herein. The non-absorbent, thermally non-conductive thermoplastic material which forms the top layer of the sheet material herein includes a plurality of spaced apertures defining strands or wall sections between the apertures. These wall sections, preferably in the shape of interconnected squares, rectangles, hexagons and the like, are relatively small, i.e., on the order of about 0.6 millimeters in height and 0.5 millimeters in width. While such wall sections are strong in compression, the application of a shear force to the top layer can induce the wall sections to stretch and move relative to one another which can cause tearing in the absence of constraint. One purpose of the non-woven layer of the sheet material herein is to provide dimensional stability of the apertured top layer so that its wall sections can resist relative movement under the application of shear forces. The apertured top layer is preferably heat-bonded or otherwise permanently affixed along its entire surface area to the non-woven layer which has sufficient tear strength to substantially constrain the wall sections from movement relative to one another under the application of a shear force. This greatly enhances the dimensional integrity and durability of the apertured top layer, particularly when the sheet material is used to fabricate such items as insoles incorporated in articles of footwear intended for active sports wherein the front-to-back, side-to-side and/or rotational motion of the foot upon the insole can be severe.

Another purpose of the non-woven layer is to remove moisture from the area of the apertured top layer so that the exposed surface of the apertured top layer remains substantially dry. In one presently-preferred embodiment, the non-woven layer is formed of a mixture of adsorbent moisture-wicking fibers and moisture absorbent fibers, at least some of which are heat-bonded to the thermoplastic material forming the apertured top layer. The moisture-wicking fibers are effective to wick or transmit moisture away from the apertured top layer to the moisture-absorbent fibers which absorb the moisture. When the sheet material is used in the fabrication of insoles for articles of footwear, for example, this moisture-absorbent feature of the non-woven layer assists in maintaining the foot and sock of the wearer dry thus greatly enhancing comfort and the performance of the footwear.

In addition to the moisture-absorbency, dimensional stability and durability provided by affixing the non-woven layer to the apertured top layer, the non-woven layer also contributes to the structural integrity of multi-layer sheet material made in accordance with the teachings of this invention. In one alternative embodiment herein, the surface of the non-woven layer opposite the apertured top layer is affixed to a cushioning layer such as crosslinked polyethylene, latex foam, or other cushioning materials. It has been found that the moisture-wicking and moisture-absorbing fibers forming the non-woven material create an extremely effective bond with cushioning material of the type mentioned above. It is believed that the fibers of the non-woven material at least partially entangle or intertwine with the cushioning material thus providing a comparatively large surface area of contact therebetween so that an extremely secure bond is formed between the non-woven material and the cushioning layer. As a result, sheet material herein which is formed by the laminate of an apertured top layer, a non-woven layer and a cushioning layer is securely held together and there is little chance of delamination of any one of the three layers from the others.

In another aspect of this invention, it is recognized that different types of materials are preferable to others in forming the cushioning layer of the sheet material herein, depending upon the particular type of activity for which the sheet material is intended. In the fabrication of one type of insoles for shoes, for example, one preferred material is polyurethane. The polyurethane is introduced in liquid form into either an "open" mold, which is analogous to a waffle iron, or a closed mold, which is analogous to an injection mold, to form the insole. In order to combine the polyurethane with the form of the sheet material herein which comprises a laminate of the apertured top layer and the non-woven layer, such laminate must be introduced into the mold with the liquid polyurethane. It has been found that in the course of closing the mold halves of the open mold, or in introducing the liquid polyurethane into the closed mold, sufficient pressure is developed to force the liquid polyurethane through the non-woven layer and through the apertures in the apertured top layer of the sheet material. This produces a "bleed-through" problem wherein at least a portion of the polyurethane is located atop the apertured top layer in the form of beads after the polyurethane has cured.

In another type of insole fabricated with the sheet material of this invention, liquid polyurethane is deposited onto a conveyor belt and the combined apertured top layer and non-woven layer is then laminated thereto. This produces a three-layer sheet material having an apertured top layer, a bottom layer of polyurethane and a non-woven layer sandwiched therebetween. It has been found that since the non-woven layer contacts the polyurethane while it is in a liquid state, the polyurethane can be absorbed by the moisture-absorbent fibers within the non-woven layer. Once the polyurethane cures, the overall moisture-absorbency of the non-woven layer can be greatly reduced due to the presence of the absorbed polyurethane.

In order to avoid bleed-through of polyurethane, and to prevent a loss of moisture absorbency in the non-woven layer, a further embodiment of the sheet material of this invention is provided. In this embodiment, a "two-sided" non-woven material is employed within the non-woven layer, one side of which is affixed to the apertured top layer and the other side of which is affixed to a "barrier layer" or directly to a cushioning layer. This barrier layer is preferably a thin layer of acrylic latex, polyethylene, ethylenevinyl acetate copolymer, vinyl or similar materials which are substantially liquid impervious. The "two-sided" non-woven material consists of a fabric layer having a first portion formed of a mixture of adsorbent, moisture-wicking fibers and moisture-absorbent fibers, connected to a second portion containing fibers which are non-adsorbent and non-absorbent. Preferably, the first portion of the non-woven layer includes a mixture of acrylic fibers and synthetic or natural cellulosic fibers, whereas the second portion is formed of polyester fibers.

In one embodiment of the sheet material herein, the first portion of the non-woven layer is heat-bonded to the apertured top layer, and the second portion of the non-woven layer is affixed to the barrier layer. The non-adsorbent and non-absorbent polyester fibers forming the second portion of the non-woven layer are effective to prevent the barrier layer from entering and being absorbed within the first portion of the non-woven layer. In turn, the barrier layer is effective to block the flow of the liquid polyurethane during a pressurized molding operation using either type of molding apparatus mentioned above, so that there is no bleed-through of the polyurethane into the non-woven layer or into the apertured top layer in the finished insole.

In alternative embodiment of the sheet material herein, the barrier layer can be eliminated without sacrificing the moisture-absorbency of the finished material. In this embodiment, the second portion of the two-sided non-woven material is affixed to liquid polyurethane deposited onto the conveyor belt in the fabrication method noted above. The moisture absorbency of the non-woven material is retained because the non-adsorbent and non-absorbant polyester fibers within the second portion of the non-woven layer are effective to block penetration of the liquid polyurethane into the moisture-absorbing first portion of the non-woven layer.

It is presently contemplated that such barrier layer may also be eliminated in other types of sheet materials made in accordance with this invention. For example, sheet materials having a cushioning layer of a latex foam or crosslinked polyethylene foam do not require a barrier layer since these materials have a more solid consistency when combined with the apertured top layer and non-woven layer, e.g., like whipping cream, and do not tend to "soak" or absorb into such sheet material prior to curing. In these embodiments, the two-sided non-woven layer may also be eliminated and replaced with the "one-sided" non-woven material, e.g. wherein the entire layer is formed of a mixture of moisture-wicking and moisture-absorbent fibers.

In any of the embodiments of the sheet material herein mentioned above, an important aspect of this invention is predicated upon the frictional characteristics exhibited by the apertured top layer of the sheet material. In the presently preferred embodiment, the apertured top layer is formed of an ethylene-vinyl acetate copolymer whose vinyl acetate content can be varied to alter the coefficient of friction of the material. Tests have shown that regardless of the vinyl acetate content and resulting coefficient of friction, the apertured top layer of the sheet material of this invention exhibits the same coefficient of friction wet or dry. This feature of the apertured top layer provides substantial benefits in the functionality of the sheet material, particularly in applications wherein the sheet material is expected to come into contact with moisture but maintain its slip-resistance.

For example, one aspect of the construction of the apertured top layer of the sheet material herein which is particularly advantageous when it is used in the manufacture of footwear insoles involves protection of the foot from blistering and other discomfort caused by movement of the foot with respect to the sock. In such application, the coefficient of friction of the apertured top layer of the sheet material herein is selected such that the magnitude of the frictional engagement between the apertured top layer and sock is less than the magnitude of frictional engagement between the sock and foot. This is true whether or not the apertured top layer is wet or dry. In the environment of the interior of an article of footwear, the objective is to prevent movement of the foot with respect to the sock. By ensuring that the magnitude of the frictional engagement between the apertured top layer of the sheet material and sock is less than that between the sock and foot, the sock and foot are made to move as a unit along the insole while the foot is held substantially fixed with respect to the sock. Because the foot is prevented from sliding within the sock, the rubbing movement of the foot which can cause blisters is substantially eliminated.

Another advantage of the construction of the sheet material herein involves the capability of altering the coefficient of friction of its apertured top layer according to the requirements of a particular application. As mentioned above, the apertured top layer is preferably formed of a non-absorbent, thermally non-conductive thermoplastic material such as an ethylene-vinyl acetate copolymer. By varying the vinyl acetate content of such material, the coefficient of friction of the apertured top layer can be varied to produce a relatively slippery surface, a comparatively tacky or sticky surface, and, anything in between. It is contemplated that in applications for the sheet material herein such as a covering for the decks of swimming pools, the floors of boats, outdoor carpeting, floor mates, grips of tools and tennis and racquetball rackets, gloves and the like, the vinyl acetate content of the apertured top layer should be adjusted to produce a "tacky" or highly slip-resistant surface. This assists one in keeping his or her footing on these surfaces, or the hands on such objects, and, as discussed above, such coefficient of friction of the apertured top layer does not vary even when it becomes wet. Additionally, the sheet material intended for these types of applications can be fabricated with a cushioning layer of essentially any thickness to provide the desired degree of shock absorption in the event of a fall on such surface or to enhance the comfort of a grip.

Control of the frictional characteristics of the top surface of an insole is important to the comfort, feel and functionality of such insole. The sheet material of this invention is particularly useful in the fabrication of footwear insoles, and the coefficient of friction of its top layer is variable depending upon the type of activity for which the article of footwear is intended. For example, activities such as basketball, racquetball, squash, aerobic exercises and the like are typically played on surfaces such as lacquered hardwood floors which permit little or no movement of the outsole of an article of footwear with respect to such surfaces. The same is true of "Astroturf" or other forms of artificial playing surfaces. Because of the relatively high coefficient of friction of such surfaces, and the design of the outsole of the articles of footwear intended for use on such surfaces, relatively high shear forces are applied to the article of footwear to the foot and sock while playing activities on such surfaces. On the other hand, many other types of activities do not result in the application of high shear forces to the foot, and considerations such as comfort, feel and control of the shoe are more important. For example, activities such as the play of tennis on clay courts or soccer on grass results in the shoe readily sliding with respect to the playing surface. Running, walking, hiking and similar activities also do not result in the application of comparatively high shear forces to the foot.

Insoles can be fabricated from the sheet material of this invention to accommodate all of the activities mentioned above. In order to avoid the application of undue shear forces to the foot during activities played on high friction surfaces, the coefficient of friction of the apertured top layer of the sheet material herein is reduced to permit at least some sliding motion of the foot and sock along the apertured top layer in response to the application of shear forces. Sheet material used to fabricate insoles for activities which impose lower shear forces on the foot include an apertured top layer whose coefficient of friction is increased. This increases the magnitude of the frictional engagement between the insole and sock to provide an enhanced feeling of control of the article of footwear and improved comfort. But in either of these applications, the coefficient of friction of the apertured top layer of the sheet material is nevertheless controlled so as to ensure that the magnitude of the frictional engagement between the sock and apertured top layer of the sheet material is maintained less than the magnitude of the frictional engagement between the sock and foot during any particular activity. This prevents movement of the foot relative to the sock and thus protects the foot from blistering.

BRIEF DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE INVENTION

Figure 1:
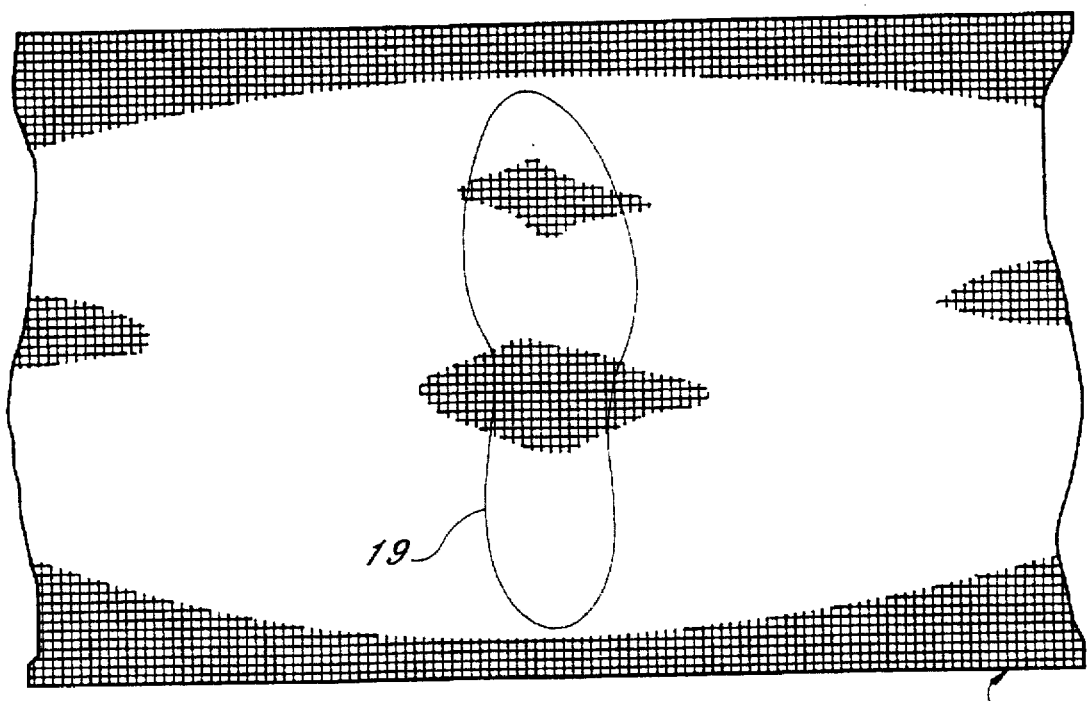
FIG. 1 is a plan view of the sheet material according to this invention in which the outline of an insole is schematically depicted.

Referring now to FIG. 1, a schematic view of one embodiment of a sheet material 18 is illustrated. The sheet material 18 is depicted with an outline of an insole 19 which can be cut out from the sheet material 18, and which represents one type of an article which can be made from the sheet material 18. This invention is directed to various constructions of sheet material for use in articles such as insoles, indoor-outdoor carpeting, floor coverings for boats, campers and swimming pool decks, floor mats, gloves, grips for various products and a variety of other items.

Figure 2:
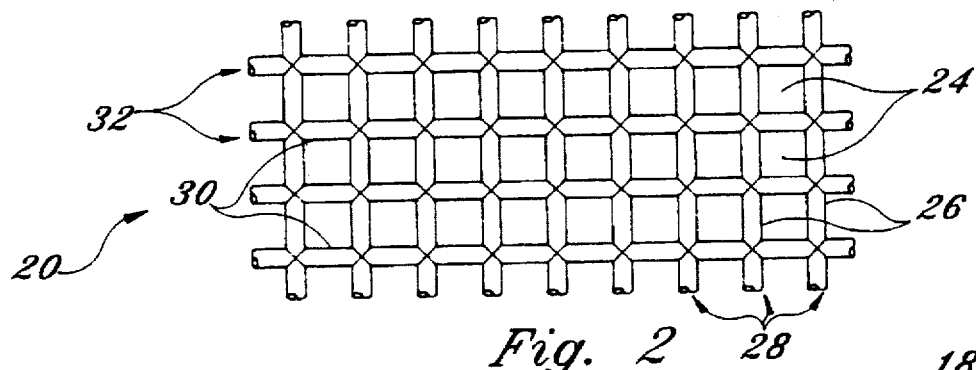
FIG. 2 is an enlarged plan view of a portion of the apertured top layer included in the sheet material of FIG. 1.
Figure 3:
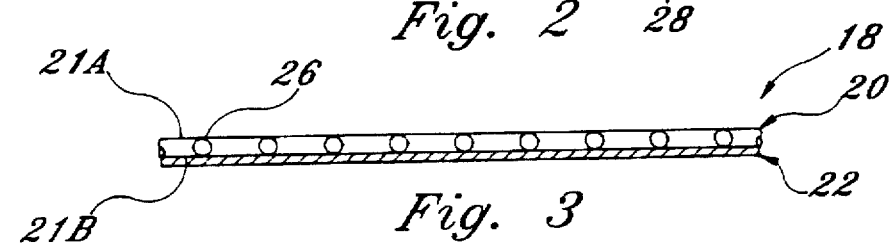
FIG. 3 is an enlarged cross sectional of one embodiment of the sheet material of this invention.

With reference to FIGS. 2 and 3, the sheet material 18 comprises an apertured top layer 20 affixed to a non-woven layer 22. As described below, a number of alternative embodiments are disclosed herein but each incorporates the basic construction of sheet material 18. In the presently preferred embodiment, the apertured top layer 20 is formed of a non-absorbent, thermally non-conductive thermoplastic material such as an ethylene-vinyl acetate copolymer commercially available from U.S. Industrial Chemicals Company of Tuscola, Ill. under the registered trademark "ULTRATHENE." A plurality of apertures 24 are formed at regular intervals from one another within the top layer 20. These apertures 24 define spaced strands or wall sections 26 of thermoplastic material arranged in side-by-side columns 28, and spaced strands or wall sections 30 of thermoplastic material arranged in side-by-side rows 32. In one presently preferred embodiment, the apertures 24 in the top layer 20 are substantially square in cross section, i.e., wherein the columns 28 and rows 32 of wall sections 26 and 30, respectively, intersect one another at right angles. It is contemplated, however, that the apertures 24 could be formed in shapes such as rectangular, octagonal, hexagonal and others preferably having walls intersecting at an angle of 90° or greater. The dimensions of the apertures 24 are not critical, although it is preferable that there be in the range of about 7 to 107 apertures 24 per square centimeter of surface area of the apertured top layer 22. With square apertures 24, this produces a "strand count" in the range of about 1 to 14 strands per lineal centimeter in both directions. It has been found that within this range, a strand count of about 8 to 9 strands per centimeter is acceptable for most applications of the sheet material 18, including the fabrication of insoles 19. An apertured top layer 20 with a "strand count" of 8 to 9 is meant to refer herein to an apertured top layer 20 having 8 to 9 columns 28 of wall sections 26 within one centimeter in a right-to-left direction as viewed in FIG. 2, and 8 to 9 rows 32 of wall sections 30 within one centimeter in a top-to-bottom direction as viewed in FIG. 3. This range of strand counts is not intended to be restrictive of the configuration of top layer 20, but it has been found that such configuration produces a top layer 20 which exhibits good performance properties.

The thickness or height of the wall sections 26 and 30 forming the apertured layer 20, i.e., their largest transverse dimension measured in a vertical plane as viewed in FIG. 3, for example, is preferably in the range of about 0.38 to 3.8 millimeters. More preferably, the thickness of such wall sections 26, 30 is about 0.6 millimeters. The width of the wall sections 26 and 30 measure in a horizontal plane as viewed in FIG. 2 is preferably in the range of about 0.38 to 3.8 millimeters, and more preferably about 0.5 millimeters. It is contemplated that the height or thickness dimension, and the width dimension, of the walls section 26 and 30 would be increased as desired for a particular application. The above ranges of dimensions of the wall section 26 and 30 are therefore not intended to be restrictive. Additionally, in the embodiment of the sheet material 18 illustrated in FIG. 3 and in other embodiments discussed below, the wall sections 26 and 30 forming the apertured top layer 20 have a generally circular or at least arcuate-shaped cross section. It is contemplated, however, that the cross section of the wall sections 26, 30 could be square or rectangular in shape depending upon the configuration of the extrusion equipment used to form apertured top layer 20.

Additionally, in one presently preferred embodiment, a quantity of thermoplastic elastomer is added to the ethylene-vinyl acetate copolymer in an effective amount to prevent wrinkling of the sheet material after it is extruded, and in preparation for combination with the non-woven layer 22. The thermoplastic elastomer content of the top layer 20 is preferably in the range of about 20% to 40% by weight, and more preferably about 25% by weight. One suitable type of thermoplastic elastomer is commercially available under the trade name KRATON D 3226 from Shell Oil Company of Oak Brook, Ill.

Figure 7:
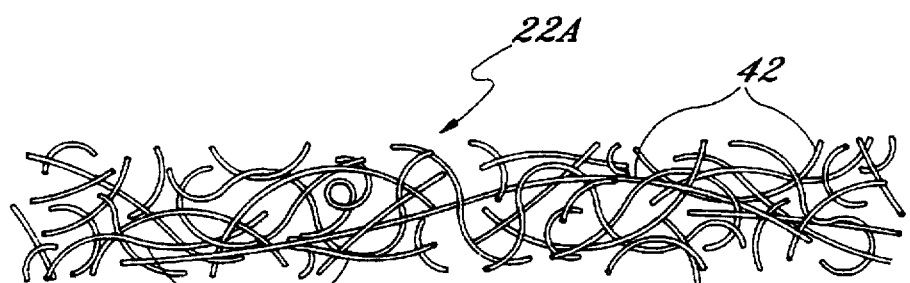
FIG. 7 is a schematic, enlarged cross sectional view of one form of the non-woven material employed in the sheet material of this invention.
Figure 8:
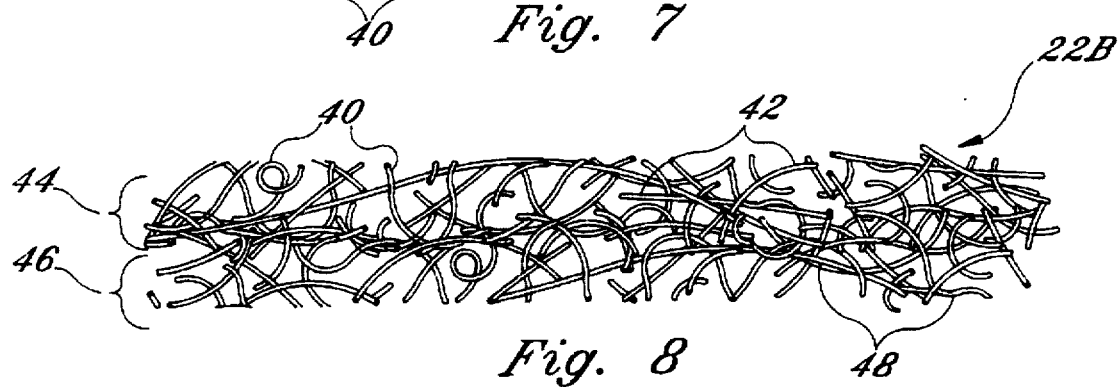
FIG. 8 is an enlarged cross sectional view of an alternative form of the non-woven material herein.

With reference to FIGS. 7 and 8, a schematic depiction of the non-woven layer 22 is provided which is formed in two configurations including a "one-sided" non-woven layer 22A (FIG. 7), and a "two-sided" non-woven layer 22B (FIG. 8). In the presently preferred embodiment, the term "one-sided" is meant to refer to a non-woven layer formed of a mixture of adsorbent, moisture-wicking fibers 40 such as acrylic fibers, and moisture-absorbent fibers 42 such as natural or synthetic cellulosic fibers. One type of non-woven material suitable for use as a one-sided non-woven layer 22A is commercially available from E. I. du Pont de Nemours and Company under the trademark COMFORSORB, and has the following specifications:

| | |
|---|---|
| fiber cross sections | round |
| fiber configuration | crimped |
| fiber length | 0.75–3.0 inches (1.9–7.6 cm) |
| denier per filament | 0.75 to 3.0 |
| tear strength | 34.7 pounds - machine direction |
| | 24.7 pounds - cross direction |
| basis weight | approximately 2 ounces per square yard |
| preferred fiber mixture | 25% to less than 50% moisture-wicking fibers; |
| | 75% to greater than 50% moisture-absorbent fibers; |
| most preferred fiber mixture | 30%–40% moisture-wicking fibers; |
| | 70%–60% moisture-absorbent fibers; |

In the presently preferred embodiment, the moisture-wicking fibers 40 are acrylic fibers which are adsorbent, i.e. these fibers effectively wick or induce the flow of moisture therealong but do not absorb moisture. Additionally, the acrylic fibers are preferably formed from a resin in which an anti-microbial substance is introduced such that the resulting acrylic fibers have anti-microbial, bacteriostatic and fungicidal properties and provide those functions upon contact with moisture and the like within the sheet material 18. One presently preferred anti-microbial substance is commercially available from Phoenix Medical Technology, Inc. of Andrews, S.C., under the name "Microban." The moisture-absorbent fibers 42 are preferably synthetic, cellulosic fibers capable of absorbing moisture upon contact which is then removed therefrom via evaporation. It is contemplated that other types of cellulosic fibers could be employed such as wood pulp etc.

The "two-sided" non-woven layer 22B schematically depicted in FIG. 8 preferably comprises a first portion 44 interconnected to a second portion 46. The first portion 44 is preferably formed of the same mixture of moisture-wicking fibers 40 and moisture-absorbent fibers 42 found in non-woven layer 22A. The second portion 46 is preferably formed of fibers 48 which are both non-adsorbent and non-absorbent, such as polyester fibers. That is, the second portion 46 of non-woven layer 22B neither absorbs liquid, such as moisture from the feet or hands, nor readily wicks or transfers liquid therealong. As discussed in more detail below in connection with a description of different embodiments of the sheet material herein, it is highly advantageous in certain applications to provide a non-woven fabric layer having the capability of moisture-absorbency on one side and a resistance to penetration by liquid on the opposite side.

The specifications for one particular two-sided non-woven layer 22B suitable for use in this invention are as follows:

| fiber cross sections | round |
| --- | --- |
| fiber configuration | crimped |
| fiber length | 0.75–3.0 inches |
| | (1.9–7.6 cm) |
| denier per filament | 0.75 to 3.0 |
| tear strength | 97.5 pounds - machine direction |
| | 60.7 pounds - cross direction |
| basis weight | 4.4 ounces per square yard |
| | 2.2 ounces first portion 44 |
| | 2.2 ounces second portion 46 |
| preferred fiber mixture of first portion 44 | 25% to less than 50% moisture-wicking fibers; |
| | 75% to greater than 50% moisture-absorbent fibers; |
| most preferred fiber mixture of first portion 44 | 30%–40% moisture-wicking fibers; |
| | 70%–60% moisture-absorbent fibers |
| preferred fiber mixture of second portion 46 | 100% polyester fiber |

In either embodiment of layers 22A and 22B, the non-woven material has a preferred basis weight in the range of about 2 to 5 ounces per square yard, a tear strength measured in the machine direction in the range of roughly about 35–100 pounds, and, a tear strength measured in the cross direction in the range of roughly about 25–60 pounds.

In the presently preferred embodiment, the above-described apertured top layer 20 and non-woven layer 22 are affixed to one another by heat bonding. For purposes of describing such attachment, the apertured top layer 20 is considered to include an outer, exposed surface 21A and an inner surface 21B. At least one of the layers 20, 22 is heated to a sufficient temperature such that the wall sections 26 of the thermoplastic material forming the top layer 20 at least partially melt, i.e. become "tacky" or softened to some extent. The layers 20, 22 are then pressed together by rollers or the like so that the wall sections 26, 30 of top layer 20 on the inner surface 21B thereof bond to the fibers 40 and/or fibers 42 forming the non-woven layer 22 along the entire surface area of the apertured top layer 20 and non-woven layer 22. A secure connection is therefore formed between layers 20, 22 of sheet material 18, while maintaining the moisture absorbency of the non-woven layer 22.

The sheet material 18 fabricated with an apertured top layer 20 and non-woven layer 22 of the materials set forth above exhibits exceptional wear characteristics even when used to form an insole 19 wherein the apertured top layer 20 can be subjected to high shear forces exerted by side-to-side, front-to-back and/or rotational movement of the foot thereon. In addition to moisture absorbency, the non-woven layer 22 of non-woven material also provides dimensional stability to the apertured top layer 20. While the apertured top layer 20 formed of an ethylene-vinyl acetate copolymer exhibits good strength in compression, its wall sections 26 and 30 tend to deform, stretch or otherwise move relative to one another under the application of shear forces. Because the non-woven layer 22 is heat laminated to the apertured top layer 20 as depicted in FIG. 3, and as described above, the wall sections 26, 30 of top layer 20 are securely affixed atop the non-woven layer 22. The non-woven material forming the non-woven layer 22 is comparatively strong in shear, e.g., preferably having a tear strength in the range of about 50 to 100 pounds depending upon its basis weight, and it is effective to stabilize the wall sections 26 and 30 of top layer 20 by substantially constraining their movement relative to one another in response to the application of shear forces to the apertured top layer 20. This substantially reduces tearing or other damage to the wall sections 26, 30 and thus increases the wear life of the apertured top layer 20.

Figure 4:
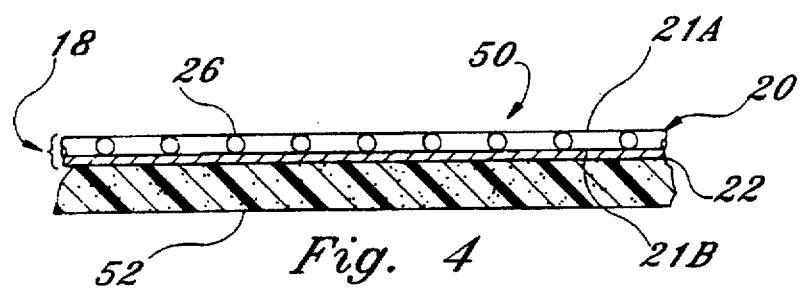
FIG. 4 is an enlarged cross sectional view of another embodiment of the sheet material herein.

Referring now to FIG. 4, an alternative embodiment of a sheet material 50 is illustrated which incorporates the same apertured top layer 20 and non-woven layer 22 of sheet material 18, and further includes a cushioning layer 52. The cushioning layer 52 is preferably formed of a resilient, cushioning material such as crosslinked polyethylene, latex foam or other open cell foam. These types of foam materials are available in sheet form and can be laminated to the non-woven layer 22 of sheet material 50 by heat bonding, adhesive or other suitable means. Because of this type of connection between cushioning layer 52 and non-woven layer 22, a one-sided non-woven layer 22A is preferably employed in the manufacture of sheet material 50, e.g., one with moisture-wicking fibers 40 and moisture-absorbent fibers 42. Nevertheless, the two-sided non-woven layer 22B could also be employed. In addition to the properties exhibited by the sheet material 18 including the top layer 20 and non-woven layer 22 discussed above, the cushioning layer 52 provides the sheet material 50 with a resilient, cushioning feel upon contact.

Figure 5:
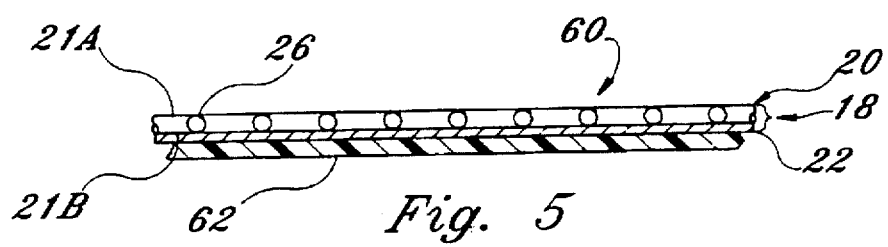
FIG. 5 is an enlarged cross sectional view of a still further embodiment of the sheet material.

With reference to FIG. 5, an alternative embodiment of a sheet material 60 according to this invention is illustrated. The sheet material 60 comprises the same apertured top layer 20 and non-woven layer 22 of sheet material 18, with the addition of a moisture-repellent barrier layer 62. In the presently preferred embodiment, the barrier layer 62 is formed of any one of a variety of substantially moisture impervious materials such as acrylic latex, polyethylene, vinyl, ethylene-vinyl acetate copolymer and the like. Additionally, the barrier layer 62 may include an antimicrobial material having bacteriostatic and fungistatic properties. One suitable antimicrobial material is commercially available under the trademark ULTRAFRESH DM50, distributed by Thomson Research Associates of Toronto, Canada.

In the embodiment of sheet material 60 depicted in FIG. 5, the non-woven layer 22 is preferably formed of the two-sided non-woven layer 22B having first and second portions 44, 46 described above. The first portion 44 of non-woven layer 22B is affixed by heat bonding or the like to the apertured top layer 20, and the second portion 46 is coated or otherwise covered by the barrier layer 62. Because the barrier layer 62 is usually in liquid form when applied to non-woven layer 22B, the presence of second portion 46 is highly advantageous. The non-adsorbent and non-absorbent second portion 46 of non-woven layer 22B effectively resists penetration of the liquid barrier layer 62 into the first portion 46 of non-woven layer 22 where it would otherwise be absorbed by the moisture-absorbent fibers 42 therein. Consequently, the moisture-absorbency of non-woven layer 22B is maintained even though a portion thereof, i.e. the second portion 46, is coated or covered with a liquid barrier layer 62.

It is contemplated that the sheet material 60 depicted in FIG. 5 could be utilized to form such articles as sockliners or insoles in a molding operation wherein liquid polyurethane is affixed to the sheet material 60 under the application of heat and pressure. The barrier layer 62 is effective to block penetration of the polyurethane into the non-woven layer 22 and thus prevent "bleed-through" or passage of the polyurethane into or through the apertured top layer 20.

Figure 6:
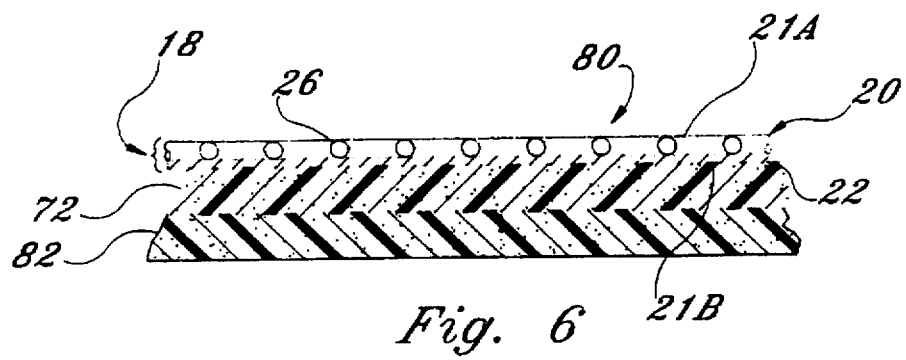
FIG. 6 is an enlarged cross sectional view of another embodiment of the sheet material.

A still further embodiment of a sheet material 80 according to this invention is illustrated in FIG. 6. Sheet material 80 preferably includes an apertured top layer 20, a non-woven layer 22, a first cushioning layer 72, and, a second cushioning layer 82 preferably formed of a heat-formable foam material such as crosslinked polyethylene. Sheet material 80 can be utilized for such applications as the fabrication of insoles for footwear where it is desired to have enhanced cushioning, e.g. with the first cushioning layer 72, and a bottom cushioning layer 82 which can be heat formed in the shape of the foot of the wearer for improved fit and feel.

The non-woven layer 22B is utilized to form non-woven layer 22 in this embodiment of sheet material 80 to maintain the moisture absorbency thereof. Preferably, the cushioning material forming first cushioning layer 72 is polyurethane or a similar material which is typically affixed in liquid form to the non-woven layer 22 using a conveyor belt as described above. The non-adsorbent and non-absorbent second portion 46 of non-woven layer 22B substantially prevents entry of the liquid polyurethane within the absorbent, first portion 44 of non-woven layer 22B thus avoiding a loss of moisture absorbency in the finished sheet material 80. The heat formable cushioning material forming second cushioning layer 82 is then affixed via heat bonding, adhesives or the like to the first cushioning layer 72.

In each of the embodiments of the sheet material depicted in FIGS. 3-7, an important aspect of their construction is the frictional characteristics exhibited by the apertured top layer 20. As mentioned above, the apertured top layer 20 is preferably formed of a non-absorbent, thermally non-conductive thermoplastic material such as an ethylene-vinyl acetate copolymer whose vinyl acetate content can be varied to alter the coefficient of friction of such material. In the presently preferred embodiment, the vinyl acetate content of the apertured top layer 20 is varied in the range of about 3% to 40% by weight so as to provide the desired coefficient of friction for a given application. For example, if any of the embodiments of the sheet material described above are to be employed in the formation of mats, floor coverings, outdoor carpeting and the like, the vinyl acetate content of apertured top layer 20 is increased to a level on the order of 12% or higher by weight. This produces an apertured top layer which has a high coefficient of friction and is highly slip-resistant.

As mentioned above, one important application of the sheet materials of this invention is in the fabrication of insoles for articles of footwear, such as insole 19 depicted schematically in FIG. 1. If any of the sheet materials 18, 50, 60, 70 or 80 illustrated and described above are employed in the fabrication of insoles, the vinyl acetate content of the apertured top layer 20 can be varied to provide a coefficient of friction such that the magnitude of the frictional engagement between such apertured top layer 20 and the sock of a wearer of the shoe in which the insole is positioned is maintained less than the magnitude of the frictional engagement between the sock and foot of the wearer. This induces the foot and sock to move as a unit along the apertured top layer 20 of any of the sheet material herein, in response to the application of shear forces to the foot, instead of allowing the sock to stick to the apertured top layer so that the foot would move relative to the sock. Movement of the foot within the sock should be avoided because it induces the formation of blisters and other foot damage. The capability of controlling the frictional engagement between the apertured top layer 20 of the sheet materials herein and the sock within an article of footwear is an important advantage in the construction of insoles.

Another important aspect of the sheet materials disclosed herein is that the frictional characteristics of the apertured top layer 20 remain substantially constant whether the apertured top layer 20 is wet or dry. This is true over the entire range of different coefficients of friction which can be provided by the apertured top layer 20 as the vinyl acetate content of the ethylene-vinyl acetate copolymer it is made of is varied. In applications where the apertured top layer 20 of the sheet materials herein can become wet, such as within the insole of a shoe, an outdoor floor mat, a floor covering of a boat, etc., it is an important advantage to provide the same degree of slip-resistance to the foot even after the apertured top layer 20 becomes wet. Additionally, the thermally non-conductive thermoplastic material from which the apertured top layer 20 is constructed provides a thermal barrier between the foot or other object placed on the sheet materials herein, and whatever surface such sheet materials overlie.

While the invention has been described with reference to a preferred embodiment, it should be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

For example, the thermoplastic material identified above which is used in forming the apertured top layer 20 of each of the sheet materials 18, 50, 60, 70 and 80, is the ethylene-vinyl acetate copolymer available under the registered trademark ULTRATHENE from U.S. Industrial Chemicals Company of Tuscola, Ill. This particular material has been found suitable because of its non-absorbent, thermally non-conductive properties, and also because it can be produced in different formulations which exhibit different slip-resistance. It is contemplated, however, that one or more other types of thermoplastic materials and/or thermoplastic elastomers could be employed in forming the apertured top layer 20 of the materials herein so long as they are capable of being formed in the configuration depicted in FIG. 2 and exhibit essentially the same non-absorbent, thermally non-conductive and slip-resistant properties as the ethylene-vinyl acetate copolymer described herein.

Additionally, the materials forming the barrier layer 62 herein can be varied so long as they exhibit moisture-repellent properties. Further, other foam materials for cushioning layers 72 and/or 82 can also be utilized, such as ethylene-vinyl acetate foam, sponge rubber foam, vinyl sponge foam and ethylene-vinyl acetate enhanced crosslinked polyethylene foam.

Therefore, it is intended that the invention not be limited to the particular embodiment disclosed as the best mode contemplated for carrying out this invention, but that the invention will include all of the embodiments falling within the scope of the appended claims.

I claim:

1. A sheet material, comprising:
   a first layer formed of a slip-resistent, non-absorbent and thermally non-conductive thermoplastic material, said first layer being formed with a plurality of apertures having wall sections therebetween, said first layer having an outer, exposed surface and an inner surface;
   a second layer affixed to said wall sections of said first layer, said second layer being formed of a non-woven material consisting of fibers which are intertwined with one another throughout the thickness of said second layer, said non-woven material having a basis weight in the range of about 2 ounces per square yard to about 5 ounces per square yard and a tear strength in the range of about 35 pounds to about 100 pounds in the machine direction and in the range of about 25 pounds to about 60 pounds in the cross direction, said second layer being effective to substantially prevent movement of said wall sections of said first layer relative to one another under the application of a shear force to said first layer having a magnitude on the order of that resulting from front-to-back, side-to-side or rotational movement of the foot of an individual within an article of footwear.

2. The sheet material of claim 1 in which said first layer is formed of an ethylene-vinyl acetate copolymer.

3. The sheet material of claim 2 in which said ethylene-vinyl acetate copolymer has a vinyl acetate content in the range of about 3% to 40% by weight.

4. The sheet material of claim 1 in which said first layer has in the range of about 7 to 107 apertures per square centimeter.

5. The sheet material of claim 1 in which said apertures are square in shape, said apertures forming spaced columns of first wall sections and spaced rows of second wall sections which intersect said first wall sections, said first layer having in the range of about 8 to 9 columns of first wall sections per lineal centimeter and in the range of about 8 to 9 rows of second wall sections per lineal centimeter.

6. A sheet material, comprising:
   a first layer formed of a slip-resistant, non-absorbent and thermally non-conductive thermoplastic material, said first layer being formed with a plurality of apertures having wall sections therebetween, said first layer having an outer, exposed surface and an inner surface;
   a second layer affixed to said wall sections of said first layer, said second layer being formed of a non-woven material consisting of a mixture of moisture-wicking fibers and moisture-absorbent fibers which are intertwined with one another in all directions throughout the thickness of said second layer, said non-woven material having a basis weight in the range of about 2 ounces per square yard to about 5 ounces per square yard and a tear strength in the range of about 35 pounds to about 100 pounds in the machine direction and in the range of about 25 pounds to about 60 pounds in the cross direction, said second layer being effective to substantially prevent movement of said wall sections of said first layer relative to one another under the application of a shear force to said first layer having a magnitude on the order of that resulting from front-to-back, side-to-side or rotational movement of the foot of an individual within an article of footwear.

7. The sheet material of claim 6 in which said moisture-wicking fibers are acrylic fibers.

8. The sheet material of claim 6 in which said moisture-absorbent fibers are cellulosic fibers.

9. The sheet material of claim 6 in which said first layer is formed of an ethylene-vinyl acetate copolymer.

10. The sheet material of claim 9 in which said ethylene-vinyl acetate copolymer has a vinyl acetate content in the range of about 3% to 40% by weight.

11. The sheet material of claim 6 in which said first layer has in the range of about 7 to 107 apertures per square centimeter.

12. The sheet material of claim 6 in which said apertures are square in shape, said apertures forming spaced columns of first wall sections and spaced rows of second wall sections which intersect said first wall sections, said first layer having in the range of about 8 to 9 columns of first wall sections per lineal centimeter and in the range of about 8 to 9 rows of second wall sections per lineal centimeter.

13. The sheet material of claim 6 in which said wall sections of said first layer have a height dimension and a width dimension each in the range of about 0.38 to 3.8 millimeters.

14. The sheet material of claim 6 in which said moisture-wicking fibers and said moisture-absorbent fibers each have a length in the range of about 1.9 to 7.6 centimeters.

15. The sheet material of claim 6 in which said moisture-wicking fibers and said moisture-absorbent fibers each have a substantially round cross section.

16. The sheet material of claim 6 in which said moisture-wicking fibers and said moisture-absorbent fibers are crimped.

17. The sheet material of claim 6 in which said second layer has a mixture in the range of about 25% to less than 50% moisture-wicking fibers, and 75% to greater than 50% moisture-absorbent fibers, by weight.

18. The sheet material of claim 6 in which said second layer has a mixture in the range of about 30% to 40% moisture-wicking fibers, and 60% to 70% moisture-absorbent fibers, by weight.

19. The sheet material of claim 6 in which said moisture-wicking fibers contain an antimicrobial agent.

20. The sheet material of claim 6 in which said moisture-wicking fibers and said moisture-absorbent fibers each have a denier per filament in the range of about 0.75 to 3.0.

21. A sheet material, comprising:
   a first layer formed of a slip-resistant, non-absorbent and thermally non-conductive thermoplastic material having a plurality of apertures defining wall sections therebetween, said first layer having an outer, exposed surface and an inner surface;
   a second layer formed of a non-woven material consisting of a mixture of moisture-wicking fibers and moisture-absorbent fibers which are intertwined with one another in all directions throughout the thickness of said second layer;
   one of said slip-resistant, non-absorbent and thermally non-conductive thermoplastic material forming said first layer, and said fibers forming said second layer, being at least partially meltable to permit heat bonding of said inner surface of said first layer and said second layer;

said non-woven material having a basis weight in the range of about 2 ounces per square yard to about 5 ounces per square yard and a tear strength in the range of about 35 pounds to about 100 pounds in the machine direction and in the range of about 25 pounds to about 60 pounds in the cross direction, said second layer being effective to substantially prevent movement of said wall sections of said first layer relative to one another under the application of a shear force to said first layer having a magnitude on the order of that resulting from front-to-back, side-to-side or rotational movement of the foot of an individual within an article of footwear.

22. The sheet material of claim 21 in which said thermoplastic material is partially meltable.

23. The sheet material of claim 21 in which said moisture-wicking fibers are acrylic fibers.

24. The sheet material of claim 21 in which said moisture-absorbent fibers are cellulosic fibers.

25. The sheet material of claim 21 in which said moisture-wicking fibers and said moisture absorbent fibers each have a length in the range of about 1.9 to 7.6 centimeters.

26. The sheet material of claim 21 in which said moisture-wicking fibers and said moisture-absorbent fibers each have a substantially round cross section.

27. The sheet material of claim 21 in which said moisture-wicking fibers and said moisture-absorbent fibers are crimped.

28. The sheet material of claim 21 in which said second layer has a mixture in the range of about 25% to less than 50% moisture-wicking fibers, and 75% to greater than 50% moisture-absorbent fibers, by weight.

29. The sheet material of claim 21 in which said second layer has a mixture in the range of about 30% to 40% moisture-wicking fibers, and 60% to 70% moisture-absorbent fibers, by weight.

30. The sheet material of claim 21 in which said moisture-absorbent fibers contain an antimicrobial agent.

31. The sheet material of claim 21 in which said moisture-wicking fibers and said moisture-absorbent fibers each have a denier per filament in the range of about 0.75 to 3.0.

32. A sheet material comprising:

a first layer formed of a slip-resistant, non-absorbent and thermally non-conductive thermoplastic material, said first layer being formed with a plurality of apertures having wall sections therebetween, said first layer having an outer, exposed surface and an inner surface;

a second layer having a first surface connected to said inner surface of said first layer and a second surface, said second layer being formed of a non-woven material consisting of a mixture of moisture-wicking fibers and moisture-absorbent fibers which are intertwined with one another in all directions throughout the thickness of said second layer, said non-woven material having a basis weight in the range of about 2 ounces per square yard to about and a tear strength in the range of about 35 pounds to about 100 pounds in the machine direction and in the range of about 25 pounds to about 60 pounds in the cross direction, said second layer being effective to substantially prevent movement of said wall sections of said first layer relative to one another under the application of a shear force to said first layer having a magnitude on the order of that resulting from front-to-back, side-to-side or rotational movement of the foot of an individual within an article of footwear;

a third layer affixed to said second surface of said second layer, said third layer being formed of a cushioning material.

33. The sheet material of claim 32 in which said moisture-wicking fibers are acrylic fibers.

34. The sheet material of claim 32 in which said moisture-absorbent fibers are cellulosic fibers.

35. The sheet material of claim 32 in which said first layer is formed of an ethylene-vinyl acetate copolymer.

36. The sheet material of claim 35 in which said ethylene-vinyl acetate copolymer has a vinyl acetate content in the range of about 3% to 40% by weight.

37. The sheet material of claim 32 in which said first layer has in the range of about 7 to 107 apertures per square centimeter.

38. The sheet material of claim 32 in which said apertures are square in shape, said apertures forming spaced columns of first wall sections and spaced rows of second wall sections which intersect said first wall sections, said first layer having in the range of about 8 to 9 columns of first wall sections per lineal centimeter and in the range of about 8 to 9 rows of second wall sections per lineal centimeter.

39. The sheet material of claim 33 in which said wall sections of said first layer have a height dimension and a width dimension each in the range of about 0.38 to 3.8 millimeters.

40. The sheet material of claim 32 in which said second layer has a mixture in the range of about 25% to less than 50% moisture-wicking fibers, and 75% to greater than 50% moisture-absorbent fibers, by weight.

41. The sheet material of claim 32 in which said second layer has a mixture in the range of about 30% to 40% moisture-wicking fibers, and 60% to 70% moisture-absorbent fibers, by weight.

42. The sheet material of claim 32 in which said moisture-wicking fibers contain an antimicrobial agent.

43. The sheet material of claim 32 in which said moisture-wicking fibers and said moisture-absorbent fibers each have a denier per filament in the range of about 0.75 to 3.0.

44. The sheet material of claim 32 in which said cushioning material forming said third layer is formed of a material selected from the group consisting of latex foam, urethane foam, crosslinked polyethylene foam, ethylene-vinyl acetate foam, ethylene-vinyl acetate enhanced crosslinked polyethylene foam, sponge rubber foam and vinyl sponge foam.

* * * * *